United States Patent
Yabe et al.

(10) Patent No.: US 8,918,814 B2
(45) Date of Patent: Dec. 23, 2014

(54) PROGRAM INFORMATION PROCESSING APPARATUS AND PROGRAM INFORMATION PROCESSING METHOD

(75) Inventors: Toshiharu Yabe, Tokyo (JP); Tatsuya Narahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 1365 days.

(21) Appl. No.: 12/178,259

(22) Filed: Jul. 23, 2008

(65) Prior Publication Data

US 2009/0031350 A1    Jan. 29, 2009

(30) Foreign Application Priority Data

Jul. 24, 2007  (JP) ................................ P2007-192144

(51) Int. Cl.
*H04N 5/445* (2011.01)
*G06F 3/00* (2006.01)
*G06F 13/00* (2006.01)
*H04N 21/482* (2011.01)

(52) U.S. Cl.
CPC ....... *H04N 5/44543* (2013.01); *H04N 21/4828* (2013.01)
USPC ................... 725/52; 725/37; 725/39; 725/40; 725/44; 725/53

(58) Field of Classification Search
USPC ..................... 725/39, 44–47, 52, 53; 715/821
See application file for complete search history.

(56) References Cited

U.S. PATENT DOCUMENTS

| | | | | |
|---|---|---|---|---|
| 7,617,511 B2* | 11/2009 | Marsh | .............................. | 725/45 |
| 7,823,177 B2* | 10/2010 | Ellis | ................................ | 725/58 |
| 2001/0020238 A1* | 9/2001 | Tsuda | ................................ | 707/5 |
| 2002/0144267 A1* | 10/2002 | Gutta et al. | ...................... | 725/46 |
| 2002/0170057 A1* | 11/2002 | Barrett et al. | .................... | 725/41 |
| 2002/0188949 A1* | 12/2002 | Wang et al. | ...................... | 725/46 |
| 2003/0088871 A1* | 5/2003 | Kimura | ............................ | 725/46 |
| 2004/0111741 A1* | 6/2004 | DePietro | .......................... | 725/34 |
| 2005/0125844 A1* | 6/2005 | Maruyama et al. | ............ | 725/135 |
| 2006/0020973 A1* | 1/2006 | Hannum et al. | .................. | 725/46 |
| 2007/0073646 A1* | 3/2007 | Uchibe et al. | ...................... | 707/2 |
| 2007/0206923 A1* | 9/2007 | Murakoshi et al. | .............. | 386/95 |
| 2008/0307017 A1* | 12/2008 | Lyons et al. | ................... | 707/204 |

FOREIGN PATENT DOCUMENTS

| | | |
|---|---|---|
| JP | 2003-18492 | 1/2003 |
| JP | 2003-018492 | 1/2003 |
| JP | 2003-209523 | 7/2003 |
| JP | 2003-219298 | 7/2003 |
| JP | 2003-230067 | 8/2003 |
| JP | 2003-329462 | 11/2003 |
| JP | 2007-124694 | 5/2007 |
| JP | 2008 236400 | 10/2008 |
| WO | WO 2005/122579 | 12/2005 |

* cited by examiner

*Primary Examiner* — Nasser Goodarzi
*Assistant Examiner* — Fred Peng
(74) *Attorney, Agent, or Firm* — Sherr & Jiang, PLLC (57) ABSTRACT

A program information processing apparatus and a program information processing method that are capable of easily conducting a program search using an electronic program guide and displaying the search result clearly on the electronic program guide. A display control unit for displaying on a display unit an electronic program guide containing information relating to a plurality of programs, a selection unit for selecting a program from the plurality of programs in response to the operation of a user, and a search unit for searching a program containing information identical to or similar to at least a part of the information of the program selected by the selection unit are included, wherein the display control unit displays search result by the search unit on the electronic program guide.

9 Claims, 8 Drawing Sheets

| | 001 AAA | 011 BBB | 022 CCC | 050 DDD |
|---|---|---|---|---|
| 3PM | NEWS ▽ ▽ WORLD NOW ▽BA... ROUND OF THE NEWS [NEWSCASTER] MYSTERY SELECTION, ATTORNEY, MS. *****2, "TRUTH OF THE MURDER" | BRITISH SHORT COMEDY CHAPTER 11: WHEN TOM RETURNS ...NG | JOURNEYING THROUGH CHINA (FINAL EPISODE) "DIVERSITY OF SOCIETIES, DIVERSITY OF PEOPLE" | |
| 4PM | TOUR TO THE UNKNOWN: "IN SEARCH OF THE HOLY GRAIL" CLASSICS OF AMERICAN DRAMA SERIES STARTED IN 19XX REMADE IN HIGH-DEFINITION. ONE EPISODE CONCLUSION STARRING A CELEBRITY FOR EACH EPISODE TREASURE HUNTING WITH GPS DEEP IN THE MOUNTAINS OF CHINA. AND GOBLET DUG OUT IS ··· | INTRODUCTION TO ASIAN MU... WEL...E TO ITALY EPISODE 8: "MANTLE OF NIGHT" (RERUN) A MYSTERIOUS WORLD BEYOND REAL ··· THE MYSTERY ZONE. THE ORIGINAL ANTHOLOGY SERVING AS A MODEL FOR "BORDER BETWEEN INSIDE AND OUTSIDE" | J-LEAGUE 20XX, J1, SECTION 34 (FINAL SECTION) NIIGATA vs. URAWA J-LEAGUE LIVE BROADCAST 20XX, THIS IS SECTION 34 (FINAL SECTION). NIIGATA vs. URAWA IS BROADCASTED | DELIGHTFUL LIVING, BEAUTIFUL SCENARY IN JAPAN "BLUE POND SPRINGING FROM UNDERGROUND OF AKIYOSHIDAI" (SHUHO-CHO) A PROGRAM FOR NAVIGATING PEOPLE STARTING A NEW LIFE. THERE IS A MYSTERIOUS MYTH ABOUT THE BLUE POND SPRINGING FROM THE LARGEST KARST TABLELAND IN JAPAN, AKIYOSHIDAI ··· |
| 5PM | | | | |

FIG.6

| | 001 AAA | 011 BBB | 022 CCC | 050 DDD |
|---|---|---|---|---|
| 3PM | NEWS ▽JAPAN & WORLD NOW ▽BACKGROUND OF THE NEWS [NEWSCASTER] MYSTERY SELECTION, ATTORNEY, MS. ***** 2, "TRUTH OF THE MURDER" | BRITISH SHORT COMEDY CHAPTER 11: WHEN TOM RETURNS | JOURNEYING THROUGH CHINA (FINAL EPISODE) "DIVERSITY OF SOCIETIES, DIVERSITY OF PEOPLE" | |
| | | TV SHOPPING | | |
| 4PM | TOUR TO THE UNKNOWN: "IN SEARCH OF THE HOLY GRAIL" CLASSICS OF AMERICAN DRAMA SERIES STARTED IN 19XX REMADE IN HIGH-DEFINITION. ONE EPISODE CONCLUSION STARRING A CELEBRITY FOR EACH EPISODE TREASURE HUNT WITH GPS DEEP IN THE MOUNTAINS OF CHINA. AND GOBLET DUG OUT IS ··· | INTRODUCTION TO ASIAN MUSIC | | DELIGHTFUL LIVING, BEAUTIFUL SCENERY IN JAPAN "BLUE POND SPRINGING FROM UNDERGROUND OF AKIYOSHIDAI" (SHUHO-CHO) A PROGRAM FOR NAVIGATING PEOPLE STARTING A NEW LIFE. THERE IS A MYSTERIOUS MYTH ABOUT THE BLUE POND SPRINGING FROM THE LARGEST KARST TABLELAND IN JAPAN, AKIYOSHIDAI ··· |
| | | WELCOME TO ITALY | | |
| 5PM | | EPISODE 8: "MANTLE OF NIGHT" (RERUN) A MYSTERIOUS WORLD BEYOND REAL ··· THE MYSTERY ZONE. ORIGINAL ANTHOLOGY SERVING AS A MODEL FOR "BORDER BETWEEN INSIDE AND OUTSIDE" | J-LEAGUE 20XX, J1, SECTION 34 (FINAL SECTION) NIIGATA vs URAWA J-LEAGUE LIVE BROADCAST 20XX, THIS IS SECTION 34 (FINAL SECTION). NIIGATA vs. URAWA IS BROADCASTED | |

FIG.7

| | 001 AAA | 011 BBB | 022 CCC | 050 DDD |
|---|---|---|---|---|
| 3PM | NEWS ▽JAPAN & WORLD NOW ▽BACKGROUND OF THE NEWS [NEWSCASTER] | BRITISH SHORT COMEDY CHAPTER 11: WHEN TOM RETURNS | JOURNEYING THROUGH CHINA (FINAL EPISODE) "DIVERSITY OF SOCIETIES, DIVERSITY OF PEOPLE" | |
| | MYSTERY SELECTION, ATTORNEY, MS. ****** 2, "TRUTH OF THE MURDER" | TV SHOPPING | | |
| 4PM | TOUR TO THE UNKNOWN: "IN SEARCH OF THE HOLY GRAIL" CLASSICS OF AMERICAN DRAMA SERIES STARTED IN 19XX REMADE IN HIGH-DEFINITION. ONE EPISODE CONCLUSION STARRING A CELEBRITY FOR EACH EPISODE. TREASURE HUNT WITH GPS DEEP IN THE MOUNTAINS OF CHINA. AND GOBLET DUG OUT IS ··· | INTRODUC... ASIAN MUSIC WELCOME ...ALY EPISODE 8: "MANTLE OF NIGHT" (RERUN) A MYSTERIOUS WORLD BEYOND REAL... THE ORIGINAL ANTHOLOGY MYSTERY ZONE. THE SERVING AS A MODEL FOR "BORDER BETWEEN INSIDE AND OUTSI... | J-LEAGUE 20XX, J1, SECTION 34 (FINAL SECTI... ...RAWA J-LEAG... LIVE BROADCAST 20XX, THIS IS SECTION 34 (FINAL SECTION). NIIGATA vs. URAWA IS BROADCASTED | DELIGHTFUL LIVING, BEAUTIFUL SCENARY IN JAPAN "BLUE POND SPRINGING FROM UNDERGROUND OF AKIYOSHIDAI" (SHUHO-CHO) A PROGRAM FOR NAVIGATING PEOPLE STARTING A NEW LIFE. THERE IS A MYSTERIOUS MYTH ABOUT THE BLUE POND SPRINGING FROM THE LARGEST KARST TABLELAND IN JAPAN, AKIYOSHIDAI ··· |
| 5PM | | | | |

PROGRAM INFORMATION PROCESSING APPARATUS AND PROGRAM INFORMATION PROCESSING METHOD

CROSS-REFERENCE TO RELATED APPLICATION

The present invention contains subject matter related to Japanese Patent Application JP 2007-192144 filed in the Japan Patent Office on Jul. 24, 2007, the entire contents of which being incorporated herein by reference.

BACKGROUND OF THE INVENTION

1. Field of the Invention

The present invention relates to a program information processing apparatus and a program information processing method.

2. Description of the Related Art

As a system for displaying a broadcast program guide on a display device such TV, an electronic program guide (EPG) is being used. EPG data is transmitted to a broadcast receiving device via a broadcast station or the Internet. The broadcast receiving device for receiving the EPG data is a TV, a video-recording/reproducing apparatus, or a personal computer, for example. With the EPG, viewers of the TV and the like can confirm lists of a plurality of broadcast programs on a screen.

In the EPG data, information such as title of the broadcast program, explanation of the program, date and time of broadcasting, name of the broadcast station and the like is contained. A search method has been proposed with which a user can find a program he wants to watch by using the EPG data. For example, JP-A-2003-18492 discloses a technology for conducting program search using the EPG data.

SUMMARY OF THE INVENTION

Meanwhile, it is difficult to find an appropriate program from a broadcast program guide without using search technologies. That is, with the EPG displayed on a screen such as a TV, only transition between units of date or transition between programs adjacent to each other on the program guide is possible, and thus, it is difficult for the user to find a program he wants to watch from large number of broadcast programs. Accordingly, a technology is being sought for easy program search using EPG data.

Further, to switch display to a broadcast program currently being broadcasted by using search result, to make video-recording reservation for the searched broadcast program, or to start reproduction of a program already video-recorded, it is needed to simply display the broadcast programs found as a result of the search, and also to easily transit to the broadcast program.

However, for example, in JP-A-2003-18492, broadcast programs found as a result of the search are listed in decreasing order of similarity with one broadcast program that is a search source (hereinafter referred to as "broadcast program serving as the search source"). Thus, the similarity between the broadcast program found as a result of the search and the broadcast program serving as the search source may become clear, but the result is displayed regardless of the time relationship or the difference of the broadcast stations between the broadcast program found as a result of the search and the broadcast program serving as the search source. As a result, it is not clear whether the broadcast program found as a result of the search is a program that is being broadcasted at the same time with the broadcast program serving as the search source, or whether it is a program already video-recorded before the broadcast of the broadcast program serving as the search source, or whether it is a program that is going to be broadcasted later than the broadcast program serving as the search source.

The present invention has been completed by addressing the issues as described above, and provides a new and improved program information processing apparatus and a new and improved program information processing method that are capable of easily conducting a program search using an electronic program guide and displaying the search result clearly on the electronic program guide.

According to an embodiment of the present invention, there is provided a program information processing apparatus including a display control unit for displaying on a display unit an electronic program guide containing information relating to a plurality of programs, a selection unit for selecting a program from the plurality of programs in response to the operation of a user, and a search unit for searching a program containing information identical to or similar to at least a part of the information of the program selected by the selection unit, wherein the display control unit displays search result by the search unit on the electronic program guide.

With such configuration, the display control unit displays on a display unit an electronic program guide containing information relating to a plurality of programs, the selection unit selects a program from the plurality of programs in response to the operation of the user, and the search unit searches a program containing information identical to or similar to at least a part of the information of the program selected by the selection unit, where the display control unit displays search result by the search unit on the electronic program guide. Accordingly, a program may be searched by using the electronic program guide, and the search result may be confirmed on the electronic program guide.

The display control unit may display the program corresponding to the search result on the electronic program guide with brightness higher than other programs or make the program corresponding to the search result blink on the electronic program guide. With such configuration, the search result may be displayed clearly.

The display control unit may display the relative positional relationship between the program selected by the selection unit and the program corresponding to the search result on the electronic program guide using an arrow. With such configuration, the relative positional relationship between the program selected by the selection unit and the program corresponding to the search result may be displayed clearly.

The display control unit may display the relative positional relationship between the program selected by the selection unit and the program corresponding to the search result by the length of the arrow changing depending on the distance between the program selected by the selection unit and the program corresponding to the search result. With such configuration, the distance between the program selected by the selection unit and the program corresponding to the search result may be confirmed by the length of the arrow.

The program information processing apparatus may include a distance calculation unit for calculating the distance between the program selected by the selection unit and the program corresponding to the search result based on at least one of the relationship between the start times of the programs and the positional relationship between the broadcast stations broadcasting the programs on the electronic program guide, and the display control unit may display the arrow having length depending on the calculated distance. With such configuration, the distance between the program selected by the selection unit and the program corresponding to the search result is calculated based on at least one of the relationship between the start times of the programs and the positional relationship between the broadcast stations broadcasting the programs on the electronic program guide, and the display control unit displays the arrow having length depending on the calculated distance.

The display control unit may display the similarity between the program selected by the selection unit and the program corresponding to the search result by using different thicknesses of the arrows. With such configuration, the similarity between the program selected by the selection unit and the program corresponding to the search result may be confirmed by the thickness of the arrow.

The selection unit may select in response to the selection of the arrow by the operation of the user the program corresponding to the search result related with the selected arrow. With such configuration, a user may select the program corresponding to the search result by selecting the arrow displayed on the display unit.

When the program corresponding to the search result from the search unit is plural, the display control unit may display relative positional relationship between a program selected, by the selection unit, from a plurality of the programs corresponding to the search result and programs other than the program selected from a plurality of the programs corresponding to the search result by the selection unit on the electronic program guide using arrows. With such configuration, when a plurality of the programs corresponding to the search result exist, and the program selected by the selection unit from the plurality of programs corresponding to the search result is selected, the relative positional relationship between the program and the programs other than the program selected by the selection unit from the plurality of the programs corresponding to the search result may be displayed clearly on the electronic program guide.

The search unit may conduct search by similarity calculation or by keyword matching based on character information of the electronic program guide. Further, the search unit may conduct search by morphologically analyzing the character information. With such configuration, by using the character information of the electronic program guide, a program containing information identical to or similar to at least a part of the information of the program selected by the selection unit may be searched.

Furthermore, according to another embodiment of the present invention, there is provided a program information processing method including the steps of displaying on a display unit an electronic program guide containing information relating to a plurality of programs, selecting a program from the plurality of programs in response to the operation of a user, searching a program containing information identical to or similar to at least a part of the information of the program selected, and displaying result of the search on the electronic program guide.

According to the present invention, a program search may be easily conducted using an electronic program guide and the search result may be clearly displayed on the electronic program guide

DETAILED DESCRIPTION OF THE PREFERRED EMBODIMENTS

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

Figure 1:
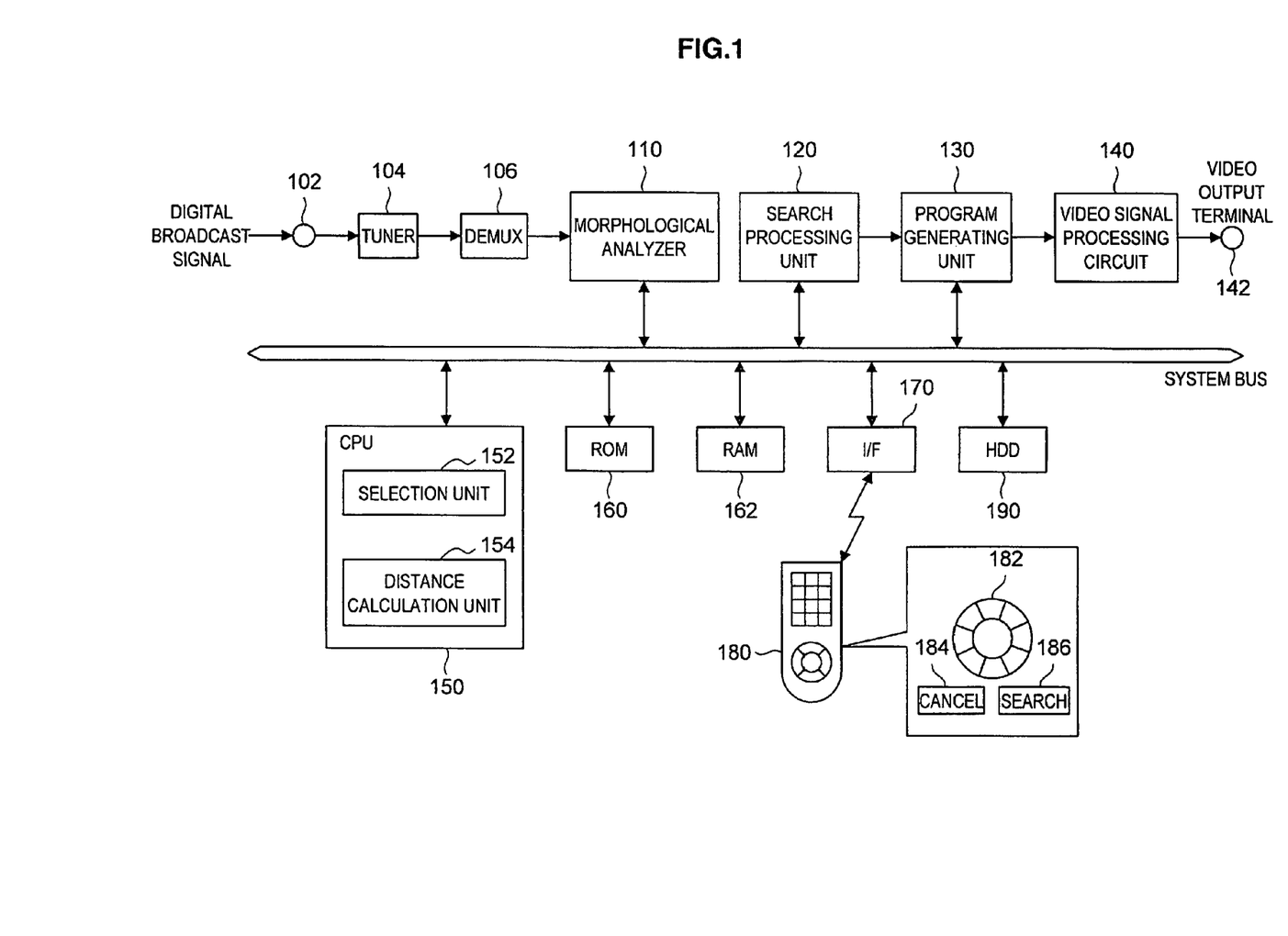
FIG. 1 is a block diagram showing a program information processing apparatus according to an embodiment of the present invention.

First, a program information processing apparatus 100 according to an embodiment of the present invention will be described. FIG. 1 is a block diagram showing the program information processing apparatus 100 according to an embodiment of the present invention.

The program information processing apparatus 100 is applied to a TV receiver for receiving digital TV broadcast, for example. The program information processing apparatus 100 receives, for example, electronic program guide (EPG) data, and displays the EPG (broadcast program listing) on a display device (not shown). As shown in FIG. 1, the program information processing apparatus 100 includes a tuner 104, a DEMUX (demultiplexer) 106, a morphological analyzer 110, a search processing unit 120, a program generating unit 130, and a video signal processing circuit 140. The program information processing apparatus 100 further includes a CPU (Central Processing Unit) 150, a ROM (Read Only Memory) 160, a RAM (Random Access Memory) 162, an I/F 170, and a HDD (Hard Disk Drive) 190.

Incidentally, the program information processing apparatus 100 is not restricted to be applied to a TV receiver, and may be applied to a video-recording/reproducing apparatus and a personal computer, for example.

The tuner 104 receives broadcast signal of digital broadcast (BS, CS, ground wave) via antenna wire/broadcast I/F 102 (interface). By providing the tuner 104 in the TV receiver, it becomes possible to watch TV broadcast received via the antenna wire. Further, the tuner 104 demodulates the received TV broadcast signal.

Incidentally, the program information processing apparatus 100 is not restricted to be provided the tuner 104, and a communication processing unit (not shown) capable of receiving TV broadcast by IP broadcast may be provided therein. Here, the communication processing unit performs communication control according to protocol such TCP/IP, and receives signals relating to content data transmitted from a distribution server via a communication I/F (interface). Further, the program information processing apparatus 100 receives EPG data transmitted from the distribution server via the communication processing unit.

The DEMUX 106 receives the demodulated signals from the tuner 104, and separates signals such as video, audio, subtitle and PSI (Program Specific Information)/SI (Service Information) from the received signals. Further, the DEMUX 106 separates EIT (Event Information Table) relating to the EPG from the received signals.

The morphological analyzer 110 morphologically analyzes the bibliographic information (character information contained in a program information) of each program of EIT separated by the DEMUX 106. The bibliographic information of each program is, for example, title of program, explanation of program, end credit of casts and the like. The morphological analyzer 110 can extract nouns (including proper nouns such as names of people, names of places, etc.) and verbs as keywords by morphological analysis. The keywords extracted by the morphological analyzer 110 are related to each program, for example, and are stored in the HDD 190. The morphological analyzer 110 checks the appearance frequency of the extracted keywords, and determines the score of each keyword according to the appearance frequency.

The search processing unit 120 is an example of the search unit and searches a program containing information identical to or similar to at least a part of the information of the program selected on the EPG. The search processing unit 120 conducts search by similarity calculation or by keyword matching search by using the keywords extracted by the morphological analyzer 110.

Figure 5:
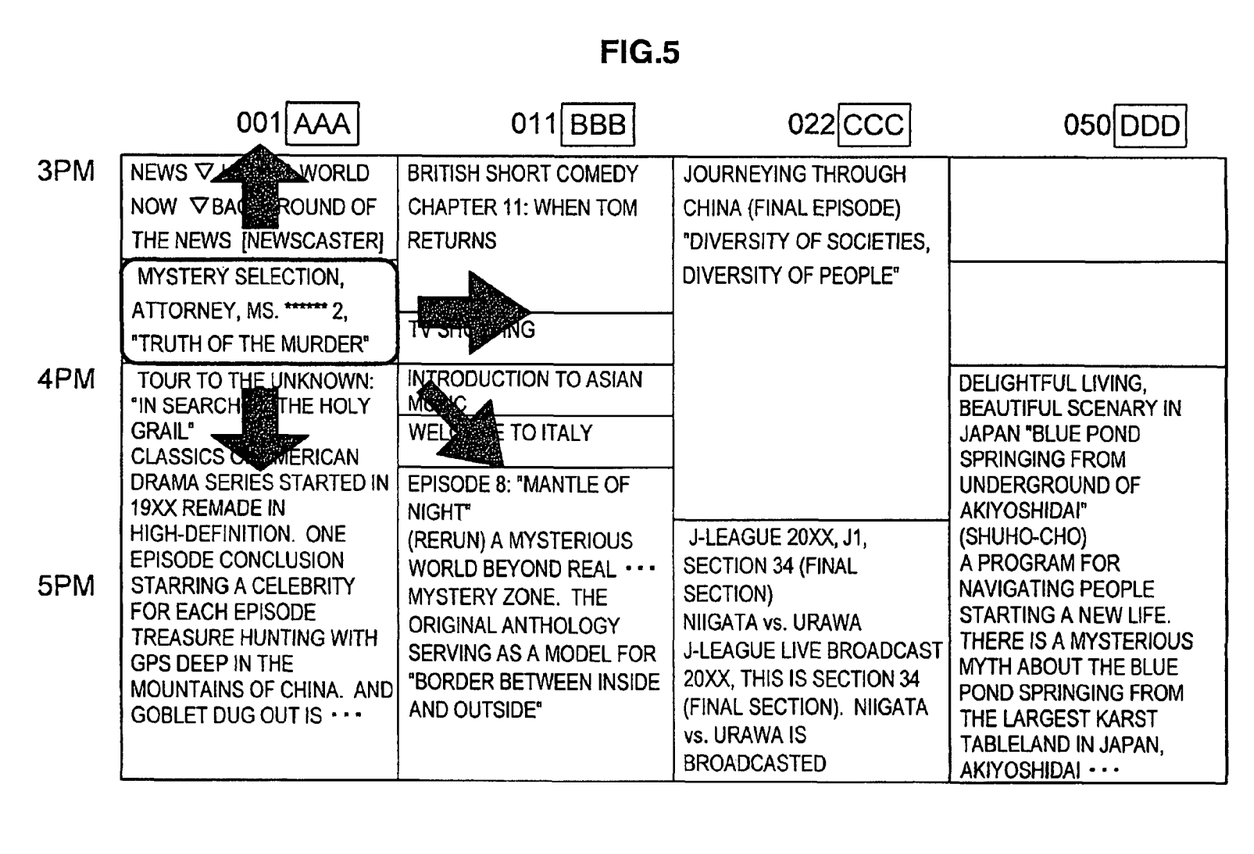
FIG. 5 is an explanatory diagram showing a display of the EPG in a radio/TV listing format.
Figure 6:
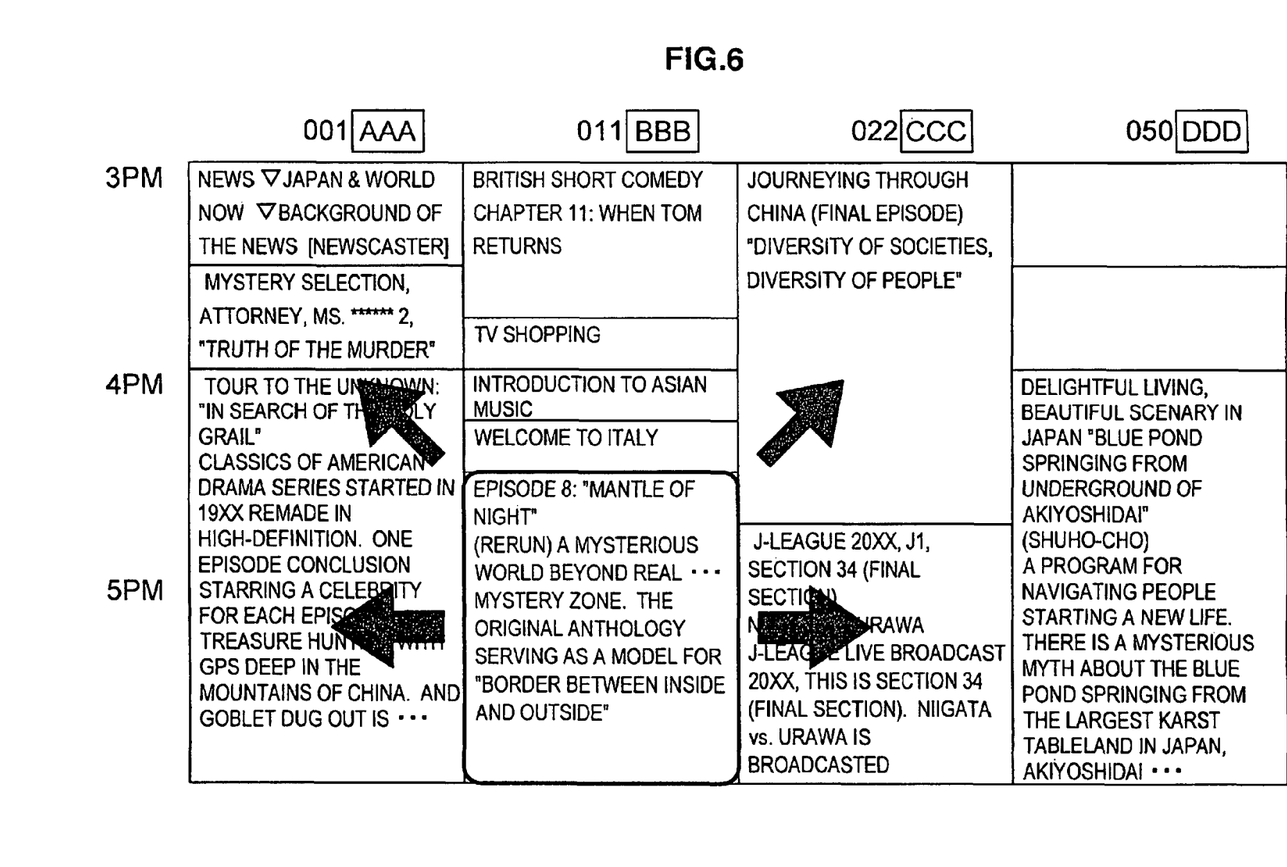
FIG. 6 is an explanatory diagram showing a display of the EPG in a radio/TV listing format.
Figure 7:
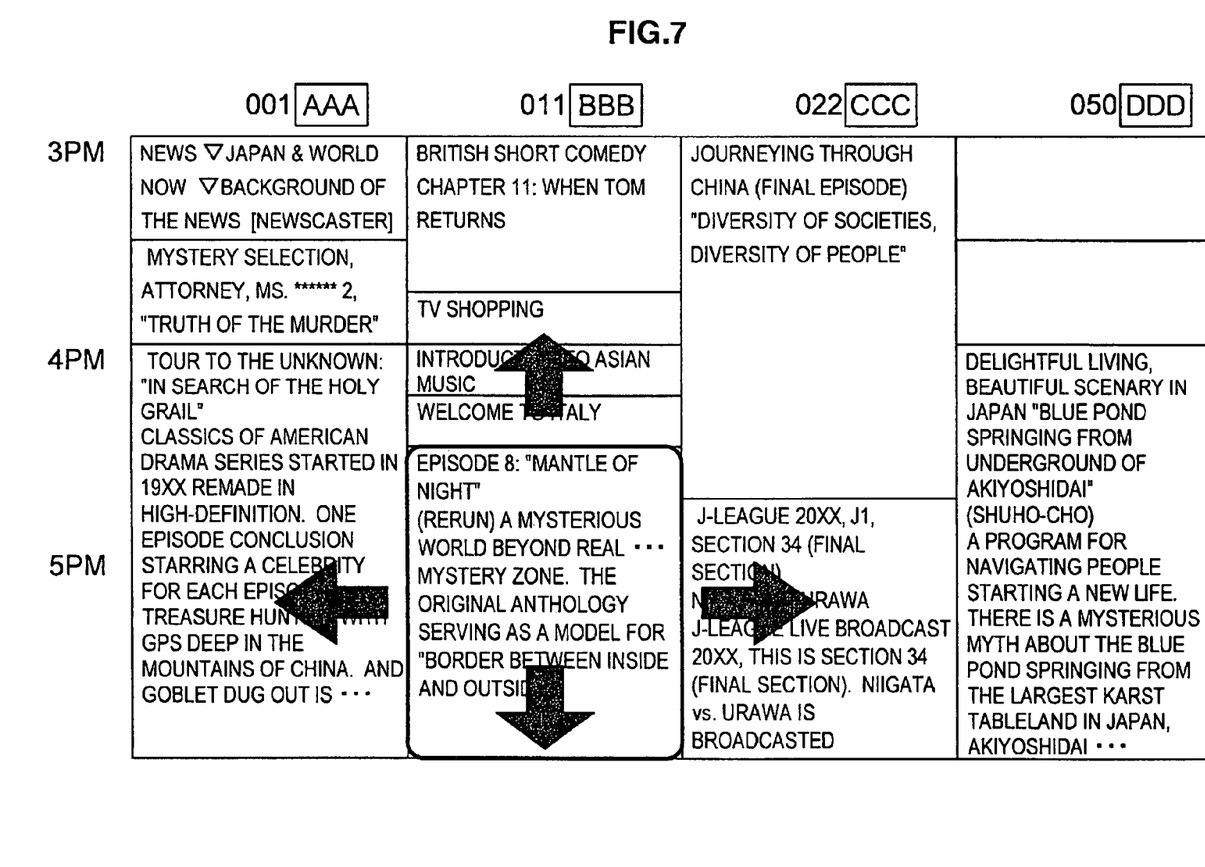
FIG. 7 is an explanatory diagram showing a display of the EPG in a radio/TV listing format.
Figure 8:
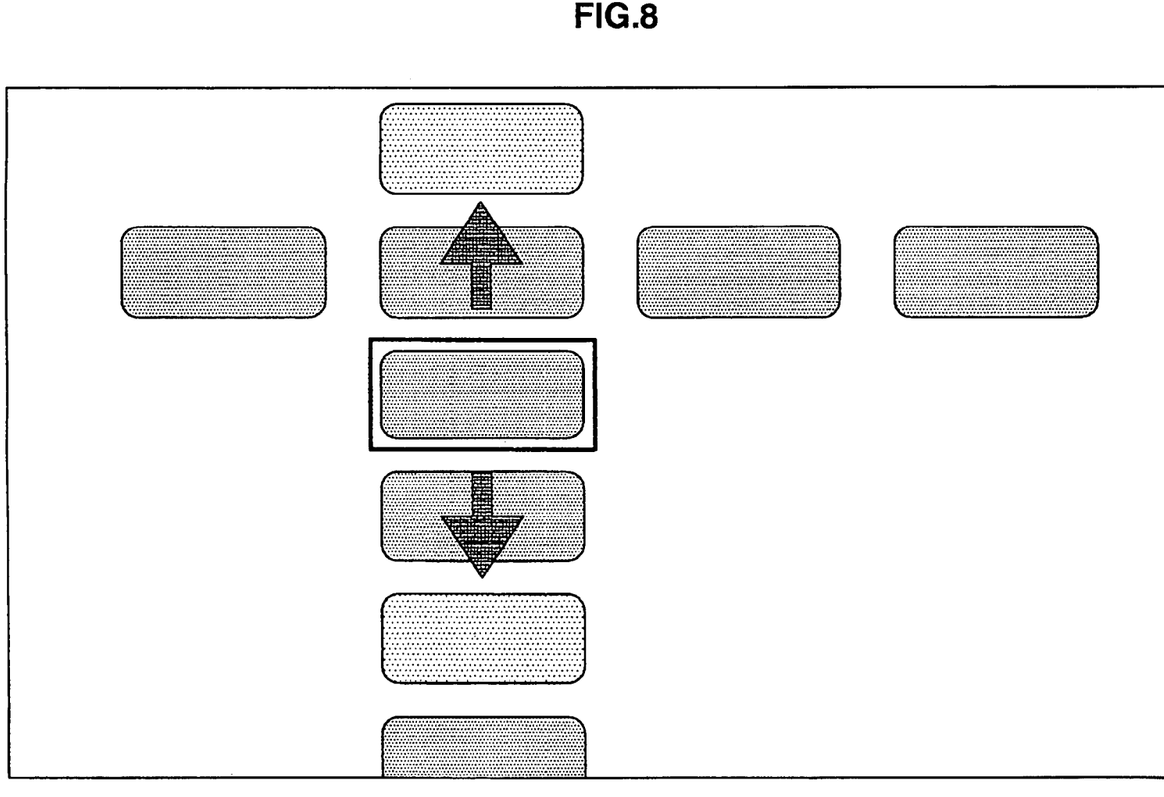
FIG. 8 is an explanatory diagram showing a display of the EPG in a Cross Media Bar format.

The program generating unit 130 generates a broadcast program guide based on the received EPG, outputs the signal to a display device (not shown) via the video signal processing circuit 140, and displays the EPG (broadcast program guide) on the display device. The program generating unit 130 is an example of the display control unit. The program generating unit 130 may display a broadcast program guide in a format of radio/TV listings of newspaper and the like as shown in FIGS. 5 to 7, or it may display broadcast programs in a format of Cross Media Bar (registered trademark) as shown in FIG. 8.

The program generating unit 130 displays the search result by the search processing unit 120 on the EPG. The program generating unit 130, for example, displays program corresponding to the search result on the EPG with brightness higher than other programs, or makes the program corresponding to the search result blink on the EPG, thereby displaying clearly the search result. The program generating unit 130 displays the relative positional relationship between one program, selected by the operation of the user, that is a search source (hereinafter referred to as "search origin program") and the program corresponding to the search result on the EPG using an arrow. The program generating unit 130 changes the length of the arrow depending on the distance between the search origin program and the search result program on the EPG, or changes the thickness of the arrow depending on the similarity between the search origin program and the search result program. The search origin program is a broadcast program, selected by a user, containing information or the like based on which the user desires to conduct a search.

Further, when there are a plurality of programs corresponding to the search result and a program is selected from the plurality of the programs corresponding to the search result by the operation of the user, the program generating unit 130 displays the relative positional relationship between the program and the programs other than the program selected from the plurality of the programs corresponding to the search result on the EPG using arrows.

The video signal processing circuit 140 reproduces data based on the video signal decoded by the video decoder or synthesizes display data such as EPG to generate data which can be watched by the user on the display device. The data generated by the video signal processing circuit 140 is output to the display device via a video output terminal 142.

The CPU 150 functions as a processing device and a control device according to the program, and can control each constituent element provided in the program information generating apparatus 100, such as the morphological analyzer 110, the search processing unit 120 and the program generating unit 130. The CPU 150 performs control of the various applications such as browser activated in the program information generating apparatus 100, control of receiving the broadcast signal, accumulation control of preserving the received content data in the HDD 190, and reproduction control of reproducing the content data stored in the HDD 190. Further, the CPU 150 includes a selection unit 152 and a distance calculation unit 154.

The selection unit 152 selects a program from the plurality of programs on the EPG in response to the operation of the user. Also, in response to the selection of an arrow on the EPG by the operation of the user, the selection unit 152 selects the program corresponding to the search result related with the selected arrow.

The distance calculation unit 154 calculates the distance between the program selected by the operation of the user and the program corresponding to the search result based on at least one of the relationship between the start times of the programs and the positional relationship between the broadcast stations broadcasting the programs on the EPG.

The ROM 160 stores program and the processing parameters and the like to be used by the CPU 150. The RAM 162 primarily stores program used at the time of execution by the CPU 150, and the parameters changeable in the execution, and the like. The I/F 170 inputs and outputs the signals between an operating unit 180 and the program information processing apparatus 100.

The HDD 190 is an example of a storage unit, and stores the content data and the EPG data, for example.

The operating unit 180 is, for example, a remote controller, and outputs signals relating to operation to the program information processing apparatus 100 by the operation of the user. The operating unit 180 is provided with, for example, direction buttons 182, a cancel button 184 and a search button 186, as shown in FIG. 1. Incidentally, the operating unit 180 is not restricted to a remote controller, and may be directly provided to the program information apparatus 100.

Next, the similarity calculation by the search processing unit 120 will be explained. The similarity calculation is to calculate the similarities between the search origin program being a program that is the search source and all the programs, that are to be searched, other than the search origin program. In the similarity calculation, keyword group contained in the respective program in the EPG are regarded as vectors (keyword vector), and the cosine ($\cos \theta$) of the vectors is calculated. The result of the calculated cosine is regarded as the similarity, and is regarded as the calculation result.

For example, the keyword groups of program A and program B (in case of proper nouns contained in program information) are as in the following Table.

TABLE 1

| Program A | 4.0: Japan | 3.0: China |           |           |
|-----------|------------|------------|-----------|-----------|
| Program B | 4.0: Japan | 2.0: U.S.A | 2.0: France | 1.0: Italy |

Here, in "4.0: Japan", for example, before the colon (:) is the score, and after the colon is the keyword. The score is determined depending on the appearance frequency.

The similarity between the program A and the program B is calculated from the cosine of the keyword vectors of the program A and the program B as shown in the following Equations.

$$\cos\theta = \frac{A \cdot B}{|A||B|} = \frac{4.0 \times 4.0(\text{Japan})}{5.0 \times 5.0} = 0.64(\text{similarity})$$  [Equation 1]

Here, $|A| = \sqrt{4.0 \times 4.0 + 3.0 \times 3.0} = 5.0$ $|B| = \sqrt{4.0 \times 4.0 + 2.0 \times 2.0 + 2.0 \times 2.0 + 1.0 \times 1.0} = 5.0$  [Equation 2]

The cosine of the keyword vectors of the program A and the program B is the similarity between the program A and the program B.

Next, a distance calculation on the EPG will be explained. The distance calculation is to calculate the distance between the search origin program or the program focused and a program corresponding to the search result. This distance is determined based on two factors, one of which is the relationship between the start times of the programs and the other is the positional relationship of the broadcast stations displayed on the EPG.

The relationship between the start times of the search origin program or the program focused and a program corresponding to the search result may be determined based on the relative time of the start times of the programs, and is represented by the relative time Dv. The positional relationship between the broadcast station of the search origin program or the program focused and the broadcast station of the program corresponding to the search result may be determined by, for example, (number of broadcast stations existing between the broadcast station of the search origin program or the program focused and the broadcast station of the program corresponding to the search result on the EPG+1)×α=Dh. Here, α is an arbitrary coefficient.

By using Dv and Dh, the distance D between the programs on the EPG may be shown by the following Equation.

$D = D_v^2 + D_h^2$  [Equation 1]

By using this distance, the search processing unit 120 may determine programs with the shortest distance in each direction to be the search result. Further, the program generating unit 130 may change the length of the arrow indicating the positional relationship between the search origin program or the program focused and a program corresponding to the search result.

Figure 2:
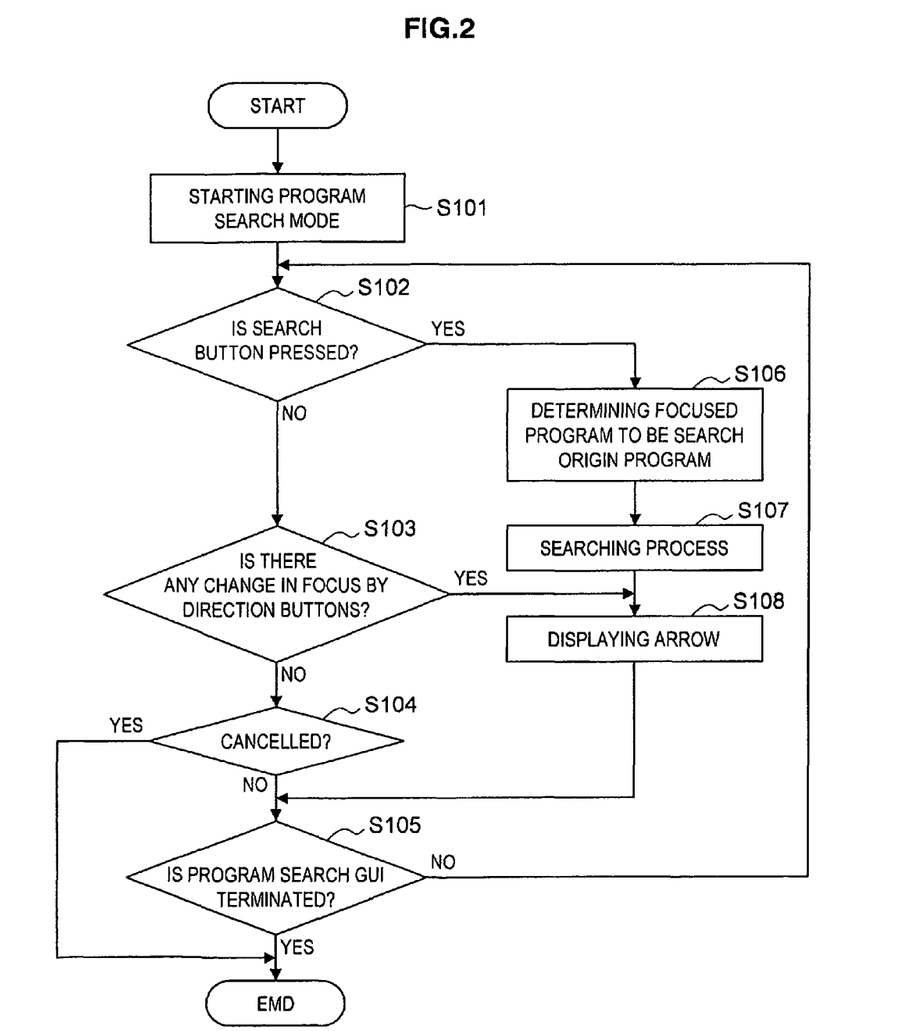
FIG. 2 is a flowchart of displaying an electronic program guide (EPG) and operation on the EPG.

Next, with reference to FIG. 2 and FIGS. 5 to 8, display of the electronic program guide (EPG) and the operation on the EPG will be explained. FIG. 2 is a flowchart of displaying an electronic program guide (EPG) and operation on the EPG. FIGS. 5 to 7 are explanatory diagrams showing displays of the EPG in a radio/TV listing format. FIG. 8 is an explanatory diagram showing a display of the EPG in a Cross Media Bar format.

First, the program information processing apparatus 100 displays the EPG on the display device. The EPG are in format of, for example, radio/TV listing as shown in FIGS. 5 to 7, or Cross Media Bar as shown in FIG. 8. With the EPG, the user may know for a plurality of broadcast stations, programs currently being broadcasted, programs broadcasted in the past, or programs to be broadcasted in the future.

Next, when the EPG is being displayed (normal mode), the user may select arbitrary program with the direction buttons 182. When the search button 186 is pressed in the normal mode, the program information processing apparatus 100 starts a program search mode. In the following, a case where the EPG is displayed and the program search mode is started will be explained (step S101). In the program search mode, when a program is selected and focused by the direction buttons 182, the program information processing apparatus 100 judges whether the search button 186 is pressed or not (step S102).

In case the search button 186 is pressed, the program information processing apparatus 100 determines the focused program to be the search origin program (step S106). Then, the program information processing apparatus 100 starts searching the EPG data with the search origin program serving as the search source (step S107). By the searching process, a program similar to the search origin program may be searched. Then, the program found as a result of the searching process to be similar to the search origin program is displayed with brightness higher than other programs or is made to blink, and further, the relative relationship between the search origin program and the program corresponding to the search result is displayed with an arrow (step S108).

The program information processing apparatus 100 judges, with the "CANCEL" button 184 pressed, for example, whether the program search GUI in the program search mode is terminated or not (step S105). If the program search GUI is not terminated, the program search mode is continued. At this time, the search origin program is not changed. On the other hand, if the program search GUI is terminated, the program search mode is terminated.

Meanwhile, a case where, in the program search mode, a program is selected and focused by the direction buttons 182 and the search button 186 is not pressed will be explained. The program information processing unit 100 judges whether there is a further change of the program to be focused by the direction buttons 182 (step S103). If there is a change of the program to be focused, the relative positional relationship between the newly focused program and the program corresponding to the search result is displayed with an arrow (step S108). On the other hand, if there is no change of the program to be focused, with the "CANCEL" button 184 pressed, for example, it is judged whether the search mode is cancelled (step S104), and when the mode is judged cancelled, the program search mode is terminated.

Figure 3:
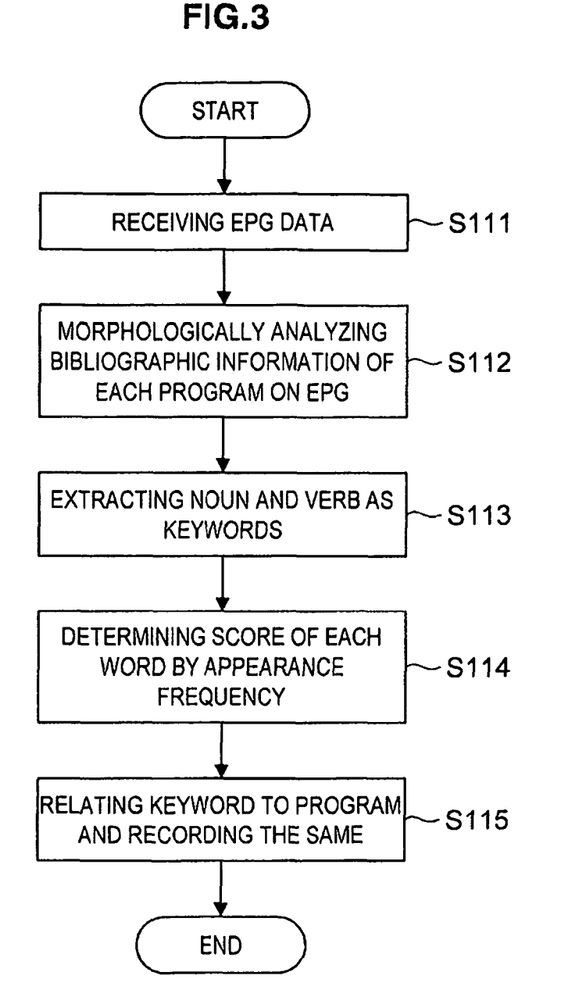
FIG. 3 is an explanatory diagram showing a process of generating keyword vector.

Next, with reference to FIG. 3, a process of generating keyword vector will be explained. FIG. 3 is an explanatory diagram showing a process of generating keyword vector.

First, the program information processing apparatus 100 receives the EPG data (step S111). The EPG data is stored in, for example, the HDD 190. Next, the morphological analyzer 110 morphologically analyzes the bibliographic information of each program on the EPG (step S112). Then, the morphological analyzer 110 extracts nouns and verbs as keywords (step S113). Further, the appearance frequency of the extracted keywords is checked, and the score of each keyword is determined according to the appearance frequency (step S114). Then, the keywords are related to the program and are recorded, for example, in the HDD 190 (step S115).

Figure 4:
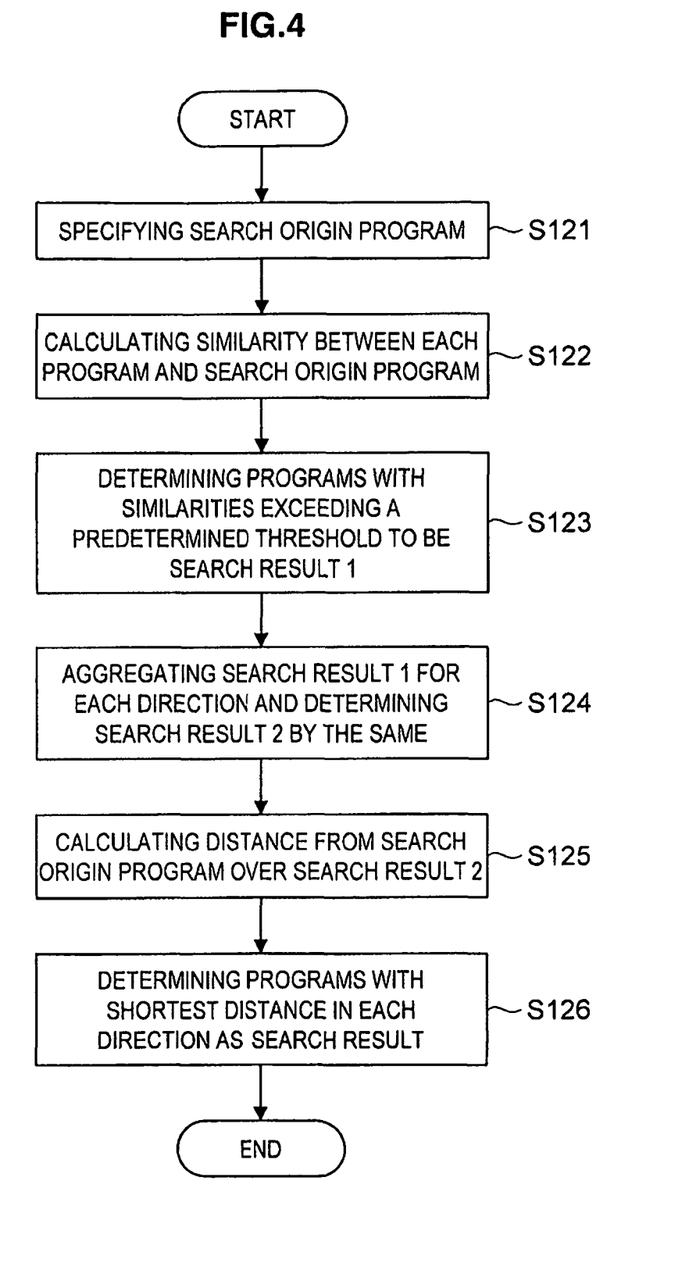
FIG. 4 is an explanatory diagram showing a process of searching.

Next, with reference to FIG. 4, a process of searching will be explained. FIG. 4 is an explanatory diagram showing a process of searching.

First, by the operation of the user, the search origin program is specified (step S121). When the search origin program is specified, the search processing unit 120 calculates the similarities of all the programs contained in the EPG data to the search origin program (step S122). Based on the similarity calculation, programs with similarities exceeding a predetermined threshold value are determined as "search result 1" by the search processing unit 120 (step S123). Next, the search processing unit 120 aggregates the search result 1 for each of the left, right, up, down, and oblique directions on the EPG. The search processing unit 120 determines the set of the aggregated programs for each direction as "search result 2" (step S124).

Next, the distance calculation unit 154 calculates the distance of the search result 2 to the search origin program (step S125). The search processing unit 120 determines, according to the result of the distance calculation, the programs with the shortest distance in each direction to be the search result (step S126).

It should be understood by those skilled in the art that various modifications, combinations, sub-combinations and alterations may occur depending on design requirements and other factors insofar as they are within the scope of the appended claims or the equivalents thereof.

For example, in the embodiment as described above, the search buttons and the like are provided on the operating unit. However, the present invention is not restricted to be as such, and the search buttons may be UI on the screen displayed on the display device, and the user may select the search buttons on the screen.

What is claimed is:

1. A program information processing apparatus, comprising:
   a display control unit for displaying on a display unit an electronic program guide containing information relating to a plurality of programs;
   a selection unit for selecting a program from said plurality of programs in response to the operation of a user; and
   a search unit for searching a program containing information identical to or similar to at least a part of the information of the program selected by said selection unit,
   wherein said display control unit displays search result from said search unit on said electronic program guide, and
   wherein said display control unit displays a relative positional relationship between said program selected by said selection unit and the program corresponding to said search result on said electronic program guide using an arrow, the length of said arrow changing depending on the distance between said program selected by said selection unit and the program corresponding to said search result.

2. The program information processing apparatus according to claim 1, wherein:
   said display control unit displays a program corresponding to said search result on said electronic program guide with brightness higher than other programs or makes said program corresponding to said search result blink on said electronic program guide.

3. The program information processing apparatus according to claim 1, comprising:
   a distance calculation unit for calculating the distance between said program selected by said selection unit and the program corresponding to said search result based on at least one of the relationship between the start times of said programs and the positional relationship between the broadcast stations broadcasting said programs on said electronic program guide,
   wherein said display control unit displays said arrow having length depending on said calculated distance.

4. The program information processing apparatus according to claim 1, wherein:
   said display control unit displays the similarity between said program selected by said selection unit and the program corresponding to said search result by using different thicknesses of said arrows.

5. The program information processing apparatus according to claim 1, wherein:
   said selection unit selects in response to the selection of said arrow by the operation of the user said program corresponding to said search result related with said selected arrow.

6. The program information processing apparatus according to claim 1, wherein:
   when said program corresponding to the search result from said search unit is plural,
   said display control unit displays relative positional relationship between a program selected, by said selection unit, from a plurality of said programs corresponding to said search result and programs other than the program selected from a plurality of said programs corresponding to said search result by said selection unit on said electronic program guide using arrows.

7. The program information processing apparatus according to claim 1, wherein:
   said search unit conducts search by similarity calculation or by keyword matching based on character information of said electronic program guide.

8. The program information processing apparatus according to claim 7, wherein:
   said search unit conducts search by morphologically analyzing said character information.

9. A program information processing method, comprising the steps of:
   displaying on a display unit an electronic program guide containing information relating to a plurality of programs;
   selecting a program from said plurality of programs in response to the operation of a user;
   searching a program containing information identical to or similar to at least a part of the information of said program selected; and
   displaying result of said search on said electronic program guide,
   wherein displaying results of said search comprises displaying a relative positional relationship between said program selected and the program corresponding to said search result on said electronic program guide using an arrow, the length of said arrow changing depending on the distance between said program selected and the program corresponding to said search result.

* * * * *